UNITED STATES PATENT OFFICE.

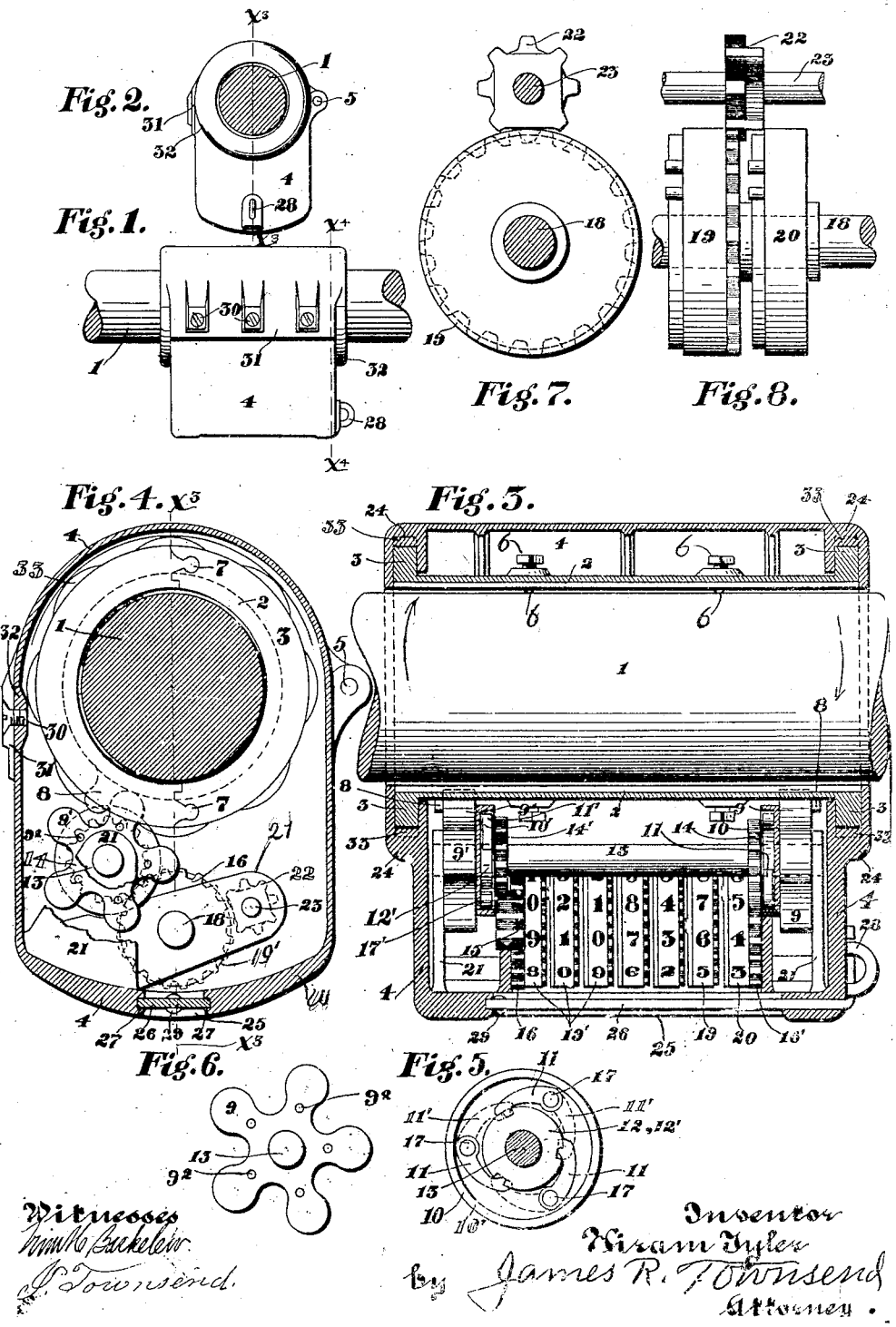

HIRAM TYLER, OF LOS ANGELES, CALIFORNIA.

MILE-METER.

No. 825,432.          Specification of Letters Patent.          Patented July 10, 1906.

Application filed June 19, 1905. Serial No. 265,835.

*To all whom it may concern:*

Be it known that I, HIRAM TYLER, a citizen of the United States, residing at Los Angeles, in the county of Los Angeles and State of California, have invented a certain new and useful Mile-Meter; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to appliances for measuring distances.

An object of the invention is to provide an appliance for registering the number of miles covered or traveled by railway-coaches, sleeping-cars, freight-cars, electric, cable, or other cars, also locomotive or other wheeled vehicles wherein the axle revolves with the wheels.

Heretofore, so far as I am aware, there has been no means for measuring and recording the distances traveled by such vehicles, for the reason that cyclometers and like appliances heretofore known for measuring distances by registering or indicating the rotations of a wheel have been inapplicable to vehicles of the kind referred to, in which the carrying-wheels are fixed to and turn with the axles, and the journal-boxes are so constructed and arranged as to make it impractical or impossible to mount any distance-measuring device in position to be actuated by the rotation of the wheel—that is to say, the bodies and frames of such vehicles are mounted on springs to move up and down relative to the carrying-wheels, and the only parts which are stationary relative to the axis of rotation of any such a wheel are the boxes in which the axle ends are journaled—and it is very difficult, if not wholly impracticable, to so mount any known travel-registering appliance as to serve the purpose of determining the distance traveled by such vehicles. Another difficulty arises from the fact that vehicles of the class referred to travel first in one and then in the other direction, forward and back.

An object of this invention is to provide a convenient appliance for determining the number of rotations a shaft or axle makes and by this means to measure the distance a wheel of determined circumference fixed thereto may travel.

I accomplish the objects aimed at by providing a meter suspended on the rotating shaft, such as the axle of a car or other vehicle, the same being constructed and arranged to be actuated thereby. As applied to railway-cars this meter is suspended loosely on the axle, and gravitation keeps the meter normally in a practically upright position.

Many mechanical means may be employed instead of those hereinafter described for carrying out this invention, and I do not limit the construction to that shown. I deem it advisable to provide the vehicle-axle with a projecting mounting, such as a separate sleeve of brass or some other suitable substance fixed on the axle and by which the case of the meter may be appropriately held antifrictionally. The case or meter-frame may be of cast-iron or any other suitable material and of any desired form, and any suitable means may be provided for holding it in place on the axle.

The invention comprises the combination, with an axle or shaft, of a meter journaled thereon and a trip or other means operated by the axle to actuate the meter mechanism. Preferably the meter is simply hung on the shaft and actuated by means carried by the shaft.

The invention also includes an appliance comprising counter mechanism and reversely-arranged devices for actuating the same progressively in one and the same direction, whereby at times one of the devices is operated in one direction to drive the counter mechanism forward and at other times the other device is operated in a direction reverse to that in which the first had been operated and in turn drives the counter mechanism forward. By combining such appliance with a rotatable body having means for acutating first one and then the other of said actuating devices as said body is rotated in first one and then in the other direction the full number of rotations of said body in both directions at any time may be determined.

For convenience the meter shown in the accompanying drawings is made to read in miles and fractions of miles. By this means it is made possible to determine the full mileage traveled by a railway or tramway car between any two points of observation or notation.

In the accompanying drawings, Figure 1 is a front elevation of a device embodying this invention. Fig. 2 is a side elevation thereof.

Fig. 3 is a front elevation with the cover removed on the vertical dotted line $x^3 x^3$, Fig. 2. Fig. 4 is a side elevation with the cover removed on the vertical dotted line $x^4 x^4$, Fig. 1. Fig. 5 is a detail of one unit of the gravity-actuated reversing mechanism. Fig. 6 is a detail of the star drive-wheel. Fig. 7 is a detail of one unit of the transfer-gearing of the counter mechanism. Fig. 8 is a front elevation of the same.

Proceeding to a detailed description of my invention, in which similar reference characters indicate corresponding parts, Figs. 3 and 4 are referred to, in which 1 designates a rotatable shaft, as the axle of a car or other vehicle. 2 is a split collar fixed on the shaft or axle 1 and having on either end flanges 3, on which is suspended the case 4, which is hinged at 5 to permit of its encircling and inclosing the collar 2 and flanges 3 after collar 2 is fixed to axle 1. Collar 2 is secured to axle 1 by set-screws 6 and dovetails 7. On collar 2 on opposite ends and in corresponding positions are lugs 8, which are located at different points along the length of said collar or sleeve 2 and which actuate the counter mechanism through star-wheels 9 9', reverse mechanism 10 11 12, shaft 13, gears 14' 15 16 16', and shaft 18.

Star-wheels 9 for actuating the counting mechanism are loosely mounted on shaft 13. In the reverse mechanism the casing 10 thereof is fixed to star-wheel 9 by rivets 9². The gravity-pawls 11 are loosely pivoted within the reverse-mechanism casing 10 on studs 17. Cam-wheels 12 and 12' are fixed on the sides of their gears 14 14', respectively. Gear 14 is fixed on shaft 13, while gear 14' is loose on said shaft. Gears 16 16' are fixed on shaft 18, and gear 16 actuates counter-wheel 20, which is the first wheel of the train and is fixed to shaft 18. The other counter-wheels 19 19' are all loosely mounted on shaft 18. Idler-gear 15 is interposed between gears 14' and 16 at one end of the counter mechanism to give the required movement. For example, if the axle 1 is rotated from right to left lugs 8 will act simultaneously on star-wheel gears 9 9'.

The gravity-mechanism pawls 11 and 11' at the opposite sides of the counter mechanism constitute a pair of reversely-arranged alternately-operating devices, so that the right to left movement of axle 1 will only transmit movement through cam 12 as pawls 11' are out of engagement with their cam 12'. Therefore the star-wheel 9' on the left side in Fig. 3 is connected with the gear 16' through the cam 12', its gear 14', idler 15, gear 16, and shaft 18. If the axle 1 is rotated from left to right, then the pawls 11' are in engagement with cam 12' and movement is transmitted through cam 12', gears 14', 15, and 16, through the shaft 18 to counter-wheel 20, fixed thereon. By the construction shown the same general direction is imparted to counter-wheel 20 at either movement of the axle, pawls 11 11' and cam-wheels 12 12' constituting pawl-and-ratchet devices to obtain this result. All the gears and counter mechanism and their journal-boxes are desirably carried in a frame 21, which is fastened in and carried by the meter case or frame 4.

Counter-wheels 19 and 20 are of a well-known pattern, and the transfer from one number of a low denomination to one of a higher is made in the usual way by the mutilated pinions 22 of the several counter units, which pinions are mounted loosely on the auxiliary shaft 23. The gears 14 16 are so proportioned as to give the correct registration on the counter-wheels for each mile or fraction thereof traveled whether the carrying-wheel (not shown) is a thirty-three-inch or forty-inch wheel or otherwise. It is apparent that for each size of car-wheels the gears 14 16 must be made of an appropriate size.

Casing 4, having receptacles or boxes 24, permits a free movement and allows the counter mechanism to hang below the shaft 1 by gravitation. An extra amount of metal or other weight, as at W, can be added to the casing to help it retain its proper position. Casing 4 has a sight-opening 25 on its under side through which the reading of the counter-wheels may be had. When this is to be closed, a slide 26 is placed in the grooves 27 and locked with any suitable lock at 28. It is advisable to have a projection 29 on the end of the slide 26 to prevent it from being misplaced or lost. This may be a riveted pin, as shown.

It is apparent from the above description that when this meter is suspended from the axle of a passenger or freight car and the car put in motion forward or backward the counting mechanism will register the travel of the vehicle just as though it were all in one general direction. The meter illustrated in these drawings is proportioned for a car having wheels thirty-three inches in diameter and is constructed to record ninety-nine thousand nine hundred and ninety-nine and ninety-nine hundredths miles. The trip-actuating devices carried by the axle of the car-wheel are specially adapted for use in combination with a counter mechanism adapted to register the rotation of a car-wheel axle, for the reason that it is difficult and inconvenient to attach a large eccentric to a car-wheel axle or to provide a car-wheel axle with cogs or similar cumbersome devices on account of the large size of the axles of such vehicles as railway-cars. It is to be understood, however, that the capacity may be increased practically without limit by the addition of counter units 19 and 22, which are well known in the art and are loosely journaled on the counter and auxiliary shafts 18 and 23, respectively. The proportions and arrangements of counter mechanism herein stated and shown are designed to cause counter-wheels 20 and 19 to indicate hundredths and tenths of a mile, respectively, while the other counter-wheels 19' successively indicate units, tens, &c., in the usual way.

30 designates means in the form of screws for securing the lapped edges 31 32 of the case 4 together, thus holding the meter in place on the flanged sleeve.

33 designates lubricating-chambers in the boxes 24 of the case 4. These are preferably filled with graphite or some other suitable hard or plastic lubricant.

The trip-actuated operating means, which includes gears 14 14', cam-wheels 12 12', and star-wheels 9 9', actuated by trips 8, constitute means for rotating the units-wheel in the same direction during each complete rotation of the car-axle whichever direction the car moves, so that practically all the movement is recorded, no complete rotation of the car-wheel being unrecorded when the car begins to move in a reverse direction, as is the case with some counting devices otherwise constructed. This is an important feature where it is desired to secure an accurate record, especially of the distance the car travels when moved back and forth short distances in switching.

What I claim is—

1. The combination with an axle, of a split sleeve fastened thereto and provided with trips at different points along the length thereof, a case journaled on said sleeve, a shaft in said case extending parallel with the axle, counter-wheels on said shaft, and gearing near each end of said shaft and operatively connected with said counter-wheels.

2. The combination, with a railway-car axle, of a split flanged sleeve provided with trips along the length thereof fixed thereto, a case or frame hung on the sleeve, counter mechanism and reversely-arranged alternately-operating devices constructed and arranged to register progressively the rotations of said railway-axle in either direction.

3. The combination with a rotatable body, of two star-wheels adapted to be actuated by the rotation of the body, a transmitting mechanism for transmitting motion from one of said star-wheels in one direction only, a gear-wheel to transmit motion so transmitted, a gear-wheel driven thereby, counter mechanism driven by said gear-wheel, and reversing mechanism and gears connected to transmit motion from the other star-wheel to said gear for driving the counter-wheels in the same direction.

4. The combination of an axle having trips 8 thereon, star-wheels 9 and 9' arranged to be actuated by the trips 8, the transmitting-casing 10, the pawls 11 pivoted thereto, cam 12 actuated in one direction by the pawls, gear 14 fastened to the cam 12, gear 16' driven by gear 14, counter mechanism 20, 19 and 19' driven by gear 16', shaft 18 fixed to gear 16', gear 16 fixed on shaft 18, idler 15 for transmitting motion to gear 16, transmitting-gear 14', cam-wheel 12' fastened to transmitting gear-wheel 14', pawls 11' constructed and arranged for driving cam-wheel 12', casing 10 to which pawls 11' are pivoted, star-wheel 9' to which casing 10' is fastened, the pawls 11' and 11 being reversely arranged substantially and for the purpose set forth.

5. The combination with an axle of a split flange sleeve fastened thereto and provided with trips, a case having boxes fitting the journal on the flanges and counter mechanism carried by the case of frame, and mechanism for transmitting motion.

6. In combination, a pair of actuating-wheels for actuating counting mechanism, means for moving said wheels in reverse directions to actuate said mechanism, counter-wheels, two sets of gearing, one for each of the actuating-wheels to transmit motion to said counter-wheels, and a pawl-and-ratchet device for each of said actuating-wheels.

7. In combination, a pair of actuating-wheels, means carried by a rotary body adapted to move both of said wheels whichever direction said body is rotated, a cam-and-ratchet device for each of said wheels, gearing for each of said wheels, the gearing for one of said wheels being provided with an idler, and counter-wheels moved by said gearing.

8. In combination, a pair of actuating-wheels, means carried by a rotary body adapted to move both of said wheels whichever direction said body is rotated, a cam-and-ratchet device for each of said wheels, and gearing for each of said wheels, and counter-wheels moved by said gearing.

9. The combination with an axle, of a split flanged sleeve fastened thereto and provided with trips located at different longitudinal points along the length of said sleeve, a case journaled on said sleeve, and counter mechanism carried by said case and adapted to be actuated by said trips.

10. The combination, with a rotary body, of a pair of trips spaced apart axially thereof, counter mechanism, and a pair of reversely-arranged devices adapted to communicate movement from said body to said counter mechanism, one of said devices moving the counter mechanism when said body rotates in one direction, and the other device moving said mechanism when the body rotates in the reverse direction.

11. In combination, an axle, means for mounting trips thereon at different points along the length thereof, a case hung on said axle, a shaft in said case extending parallel with the axle, counter-wheels on said shaft, and gearing near each end of said shaft and operatively connected with said counter-wheels.

12. The combination with an axle, of a sleeve fastened thereto and provided with trips located at different longitudinal points along the length thereof, a case journaled on said sleeve, and counter mechanism carried by said case and adapted to be actuated by said trips.

In testimony whereof I have hereunto set my hand, at Los Angeles, California, this 1st day of June, 1905.

HIRAM TYLER.

In presence of—
    JAMES R. TOWNSEND,
    JULIA TOWNSEND.